Patented Mar. 11, 1941

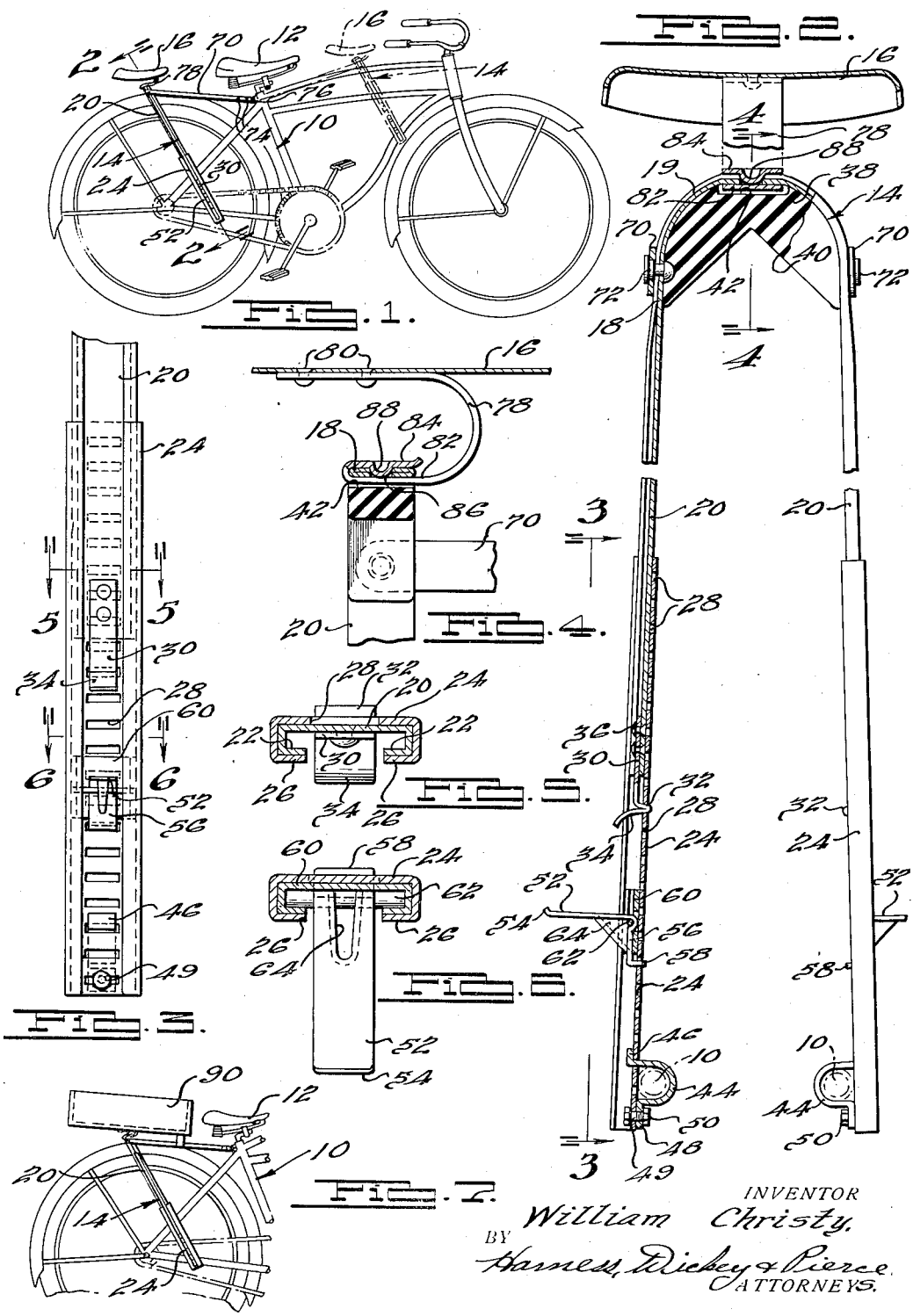

2,234,299

UNITED STATES PATENT OFFICE 2,234,299

AUXILIARY BICYCLE SEAT

William Christy, Pontiac, Mich.

Application October 1, 1938, Serial No. 232,699

4 Claims. (Cl. 155—5.12)

The present invention relates to a bicycle attachment, and particularly relates to an auxiliary seat attachment.

One of the primary objects of the present invention is to provide an improved auxiliary seat attachment for bicycles which is rigid and strong in construction and which may be economically manufactured.

Another object of the invention is to provide an improved attachment of the type mentioned which is simple in construction and which may be readily applied to or removed from a conventional bicycle.

Another object of the invention is to provide an improved auxiliary seat attachment which may be readily applied to a bicycle frame so that it is positioned either forwardly of the usual seat or rearwardly thereof.

Another object of the invention is to provide an improved auxiliary seat attachment of the type mentioned which is light in weight yet rugged, and which may be attached to the conventional bicycle in such a manner that passengers, and particularly children, may ride thereon in safety and comfort.

Another object of the invention is to provide an improved auxiliary seat attachment of the type mentioned in which the length thereof is adjustable and in which stirrups may be adjustably positioned thereon to suitable leg length.

Other objects of the invention will become apparent from the following specification, the drawing relating thereto, and from the claims hereinafter set forth.

In the drawing, in which like numerals are used to designate like parts in the several views throughout:

Figure 1 is a side elevational view of a conventional bicycle having an auxiliary seat attachment according to the present invention associated therewith;

Fig. 2 is an enlarged cross-sectional view, showing parts in elevation, taken substantially along the line 2—2 of Fig. 1 and illustrating the attachment of the present invention;

Fig. 3 is a fragmentary, side elevational view taken substantially along the line 3—3 of Fig. 2;

Fig. 4 is a fragmentary, cross-sectional view, showing parts in elevation, taken substantially along the line 4—4 of Fig. 2;

Fig. 5 is an enlarged cross-sectional view taken substantially along the line 5—5 of Fig. 3;

Fig. 6 is an enlarged cross-sectional view taken substantially along the line 6—6 of Fig. 3; and Fig. 7 is a fragmentary, side elevational view of a conventional structure having the attachment of the present invention associated therewith in which a basket, rather than a saddle, is attached to the mounting means.

Referring to the drawing, and referring particularly to Figs. 1 to 6 thereof, a conventional bicycle is illustrated including a frame, generally indicated at 10, having the usual seat 12 mounted thereon. According to the present invention, an attachment, generally indicated at 14, is attached to the bicycle frame either rearwardly of the seat 12 or forwardly thereof. The attachment 14 preferably has an auxiliary passenger seat 16 mounted thereon so that the seats 12 and 16 are intandem relationship. The seat 16 may carry an extra passenger either forwardly or rearwardly of the passenger on the usual seat, depending upon the desired location of the attachment.

The attachment 14 includes a generally U-shaped member 18 having a rounded base 19 and depending leg portions 20. The member 18 is formed of sheet metal of channel section in which the base portion 19 is preferably flattened down and the leg portions 20 form outwardly opening channels having inwardly disposed flanges 22 along the edges thereof. By forming the U-shaped member 10 of sheet metal and in channel sections, an exceptionally light and rugged construction is provided which provides sufficient stiffness and strength and at the same time which is economical to manufacture.

Each of the leg portions 20 is adapted to have an extension member 24, also formed of sheet metal and of channel section, telescopically mounted relatively thereto. Each member 24 is also provided with inwardly disposed flanges 26 along the edges thereof so that each member 24 is complemental in cross-sectional shape to the cross-sectional shape of the leg portion 20. The members 24 are of such dimensions that the inner wall surfaces thereof slidably engage the outer wall surfaces of the leg portions 20, so that the members 24 form rigid extensions of the leg portions 20 and may be adjustably slid therealong.

So that the effective length of the legs of the mounting member may be adjusted, means are provided for adjustably fixing the members 24 relative to the leg portions 20. Such means includes the provision of a plurality of longitudinally spaced, transversely extending openings 28 through the base portion of each member 24. A spring strip member 30, which is bent inwardly, as indicated at 32, and then reversely bent upon itself, as indicated at 34, is fixedly secured by means of rivets 36, or the like, to each of the leg portions 20 adjacent the lower ends thereof. The inwardly projecting portion 32 of each of the strips is adapted to be resiliently received within any one of the openings 28. When it is received within such opening, the member 24 is fixed relative to the member 20. The reversely bent portion 34 serves as a finger engaging member which extends through the channel opening and which may be grasped to release the engaging portion 32 from its cooperating opening. The member 24 may then be slid relative to the leg portion 20, and by locating the member 32 in the desired opening 28, the length of each leg may be suitably adjusted and fixed in position.

When positioned to the rear of the seat 12, the legs of the mounting member are adapted to straddle the rear mud guard of the bicycle and extend downwardly outside of the frame 10. A cushioning member, preferably of sponge rubber or the like 38, is secured within the base of the U-shaped member 18 and has a downwardly directed V-shaped under surface 40, as indicated in Fig. 4. This V-shaped under surface assures an accurate fit over any type of mud guard, so that wobbling of the mounting means is prevented. The resilient member 38 is also provided with a recess 42 at the top thereof in order to provide a space between the cushioning member 38 and the under side of the base 19 for a purpose to be described hereinafter.

The lower end of each of the leg members 24 is adapted to be removably attached to one of the frame members 10. Such frame members are generally tubular in shape, and a U-shaped member 44 is provided for each of the legs and is adapted to be removably attached thereto. Each member 44 terminates at one end in an outwardly directed tongue 46 and at the other end in an outwardly directed flange 48. The tongue 46 is adapted to be received through one of the openings 28; and a bolt 49 is adapted to be received through another one of the openings 28 and pass through an opening in the flange 48 for cooperation with a nut 50. It is evident from this description that the members 44 may be suitably positioned along the member 24 so that the construction is better adapted for attachment to various types of conventional bicycle frames. In order to attach the member 24 to the frame 10, it is merely necessary to insert the tongue 46 through one of the openings 28, in which case the member 44 straddles the frame member 10. By merely fastening a bolt through another one of the spaced openings 28 and through the opening in the flange 48, the member 44 may be fixedly secured to the frame member and to the leg member 24 so that the mounting member is rigidly attached to the bicycle frame.

Foot rests 52 are provided and are mounted to the member 24 for adjustment therealong. Such foot rests 52 are in the form of metal strips having outwardly disposed portions, which are bent upwardly slightly at the ends, as indicated at 54, and having downwardly disposed portions 56 which terminate in inwardly disposed tongues 58. A slide member 60 formed of metal and having a cross-sectional configuration complementary in shape to the cross-sectional shape of the member 24, is slidably disposed within each of the members 24. A transversely extending pin member 62 is mounted within oppositely disposed openings in the end walls of the member 60 and serves as a pivot mounting for the foot rest 52. The member 52 may be bent inwardly, as indicated at 64, forming a diagonal web adjacent the corner thereof, and openings may be provided through the web adjacent the juncture of the horizontal portion of the foot rest and the downwardly disposed portion 56 for the reception of the pin 62. The foot rest 52 may thus be pivoted relative to the member 24; and by lifting the outward end of the foot rest 52, the tongue 58 is disengaged from one of the openings 28. The foot rest 52, along with the slide 60, may then be slid along the length of the member 24. When the foot rest 52 is suitably positioned, the outer end may be released so that the tongue 58 again engages one of the openings 28. The weight of the horizontal portion of the foot rest is sufficient to retain the tongue 58 within the desired opening 28 unless positively displaced therefrom. It is evident from this description that each of the foot rests may be slidably adjusted along the length of its corresponding leg member 24, so that the foot rest may be adjusted to accommodate various leg lengths.

In order to brace the mounting member 14, bracing struts 70, which are preferably in the form of rigid metal members, are disposed at each side of the mounting member 18 adjacent the base thereof and are pivotally attached thereto by means of rivets 72 or the like. The forward ends of the members 70 are provided with a plurality of longitudinally extending openings 74 therethrough for adjustable attachment to the bicycle frame. The forward ends of the members 70 may be attached to the frame by means of the usual bolt 76, which is conventionally used on bicycles in the position indicated for fixing the mounting member of the seat 12 in adjusted position. Such bolt 76 may be passed through aligned openings 74 in the members 70, and the mounting member 14 is then rigidly attached to the bicycle frame.

The seat 16 may be removably attached to the mounting member 14 in a simplified and easy manner by means of a resilient metal spring strip member 78 which is fixedly secured to the under surface of the seat by means of rivets 80, or the like, and which is reversely bent upon itself, as indicated at 82. The end of the member 78 is then reversely bent upon itself again, as indicated at 84, to form a resilient hook construction. In order to mount the seat, this hook construction is adapted to pass under the base 19 within the space 42, and then by lifting and pulling the seat 16 in the opposite direction, the portion 84 is adapted to hook over the central portion of the base 19 and be clamped thereto. This hook resiliently engages the base and serves to retain the seat in place. In order to prevent accidental displacement of the seat due to sudden stops or jars, an opening 86 is preferably provided through the base 19 and a downwardly extending projection 88 is provided in the reversely bent portion 84. The projection 88 is adapted to be received within the opening 86 so as to resist displacement of the member 78 from the member 18.

The attachment, together with the seat, may be mounted forwardly of the usual seat 12, as indicated by the broken lines in Fig. 1. In this event, the resilient member 38 is adapted to rest upon the top cross bar of the bicycle frame. Usually a single upwardly and forwardly extending frame member is provided on the conventional bicycle, and a single strap may be passed through aligned openings 28 in the members 24 in embracing relationship to the fame member to fix the member 24 in place. The leg portions 20 are sufficiently spaced apart so that the member 18 will straddle bicycles of the type including the tanks between the cross bars, and the lower ends of the leg members may be drawn together for attachement to the frame.

In Fig. 7, the attachment is illustrated as having a basket 90 mounted thereon rather than the auxiliary seat 16. The basket 90 may be mounted to a member 78 in the same manner as the seat and be attached to the U-shaped member 18 in the same way.

Formal changes may be made in the specific embodiments of the invention described without departing from the spirit and substance of the invention, the scope of which is commensurate with the appended claims.

What is claimed is:

1. An auxiliary seat attachment for a bicycle frame comprising a U-shaped sheet metal member having a pair of depending leg members of channel section, a pair of sheet metal members of channel section telescopically mounted relative to said leg members respectively, one of said pairs of members having a plurality of longitudinally spaced openings in the base of the channel sections, means fixed on said other pair of members having resilient means removably cooperating with said openings to adjustably fix said pairs of members relative to each other, means mounting said members on said frame, said means including a bracing strut connected to said U-shaped member adjacent the base thereof, a seat member attached to said U-shaped member adjacent the base thereof, and outwardly disposed members forming foot rests attached to said pair of sheet metal members.

2. An auxiliary bicycle seat attachment for a bicycle frame comprising a U-shaped sheet metal member having a pair of depending leg members of channel section, a pair of sheet metal members of channel section telescopically mounted relative to said leg members respectively, one of said pairs of members having a plurality of longitudinally spaced openings in the base of the channel sections, means fixed on said other pair of members having resilient portions removably cooperating with said openings to adjustably fix said pairs of members relative to each other, means mounting said members on said frame, a seat member attached to said U-shaped member adjacent the base thereof, outwardly disposed members forming foot rests, means slidably mounted relative to said pair of sheet metal members adjustably attaching said foot rests to said pair of sheet metal members.

3. An auxiliary seat attachment for a bicycle frame comprising a U-shaped sheet metal member having a pair of depending leg members of channel section, a pair of sheet metal members of channel section telescopically mounted relative to said leg members respectively, said pair of sheet metal members having a pair of longitudinally spaced openings therein, means on said pair of depending leg members adjacent the lower ends thereof having resilient portions removably cooperating with said openings to adjustably fix said pairs of members relative to each other, means mounting said members on said frame, a seat member attached to said U-shaped member adjacent the base thereof, outwardly disposed members forming foot rests, means slidably mounting said last named members within said pair of sheet metal members, and means on said foot rests removably engageable with said openings to adjustably fix said foot rests in place.

4. An attachment for a bicycle frame comprising a U-shaped sheet metal member having depending leg portions of channel section, a pair of sheet metal members of channel section telescopically mounted relative to said leg portions, means adjustably fixing said last named members relative to said leg portions, means mounting said members on said frame, said last named means including a substantially rigid bracing structure connected to said U-shaped member adjacent the base thereof, a supporting means attached to said U-shaped member adjacent the base thereof, and a member of resilient material disposed within the base of said U-shaped sheet metal member, said last named member having downwardly and outwardly sloping walls on the under surface thereof.

WILLIAM CHRISTY.